(12) United States Patent
Gil et al.

(10) Patent No.: US 6,424,836 B1
(45) Date of Patent: Jul. 23, 2002

(54) METHOD FOR ALLOCATING FREQUENCY CHANNELS FOR SECTORS OF A CELL IN CELLULAR SYSTEMS

(75) Inventors: Amit Gil, Petach-Tikva; Avraham Freedman, Tel Aviv, both of (IL)

(73) Assignee: Innowave ECI Wireless Systems Ltd., Petach Tikva (IL)

(*) Notice: Subject to any disclaimer, the term of this patent is extended or adjusted under 35 U.S.C. 154(b) by 0 days.

(21) Appl. No.: 09/247,171

(22) Filed: Feb. 9, 1999

(51) Int. Cl.$^7$ ............................................... H04Q 7/20
(52) U.S. Cl. ........................ 455/450; 455/446; 455/447; 370/329
(58) Field of Search ................................ 455/447, 448, 455/450, 453, 105, 561, 562, 446; 370/329, 341, 348, 343, 344

(56) References Cited

U.S. PATENT DOCUMENTS

| | | | |
|---|---|---|---|
| 4,144,496 A | * 3/1979 | Cunningham et al. | ...... 455/445 |
| 4,558,453 A | * 12/1985 | Mimken | ............ 455/63 |
| 5,073,971 A | * 12/1991 | Schaeffer | .......... 455/447 |
| 5,257,398 A | * 10/1993 | Schaeffer | .......... 455/452 |
| 5,365,571 A | 11/1994 | Rha et al. | |
| 5,483,667 A | * 1/1996 | Faruque | .......... 455/447 |
| 5,649,292 A | * 7/1997 | Doner | .......... 455/447 |
| 5,734,983 A | * 3/1998 | Faruque | .......... 455/450 |
| 5,835,859 A | 11/1998 | Doner | |
| 5,974,323 A | * 10/1999 | Doner | .......... 455/447 |
| 6,212,385 B1 | * 4/2001 | Thomas et al. | ......... 455/447 |

FOREIGN PATENT DOCUMENTS

| | | | |
|---|---|---|---|
| DE | 4318495 | * 12/1994 | ........... H04B/7/26 |
| EP | 0592207 | 4/1994 | |
| EP | 0717-577 | 6/1996 | |
| EP | 0785695 | 7/1997 | |

* cited by examiner

*Primary Examiner*—Nay Maung
*Assistant Examiner*—Sonny Trinh
(74) *Attorney, Agent, or Firm*—Browdy and Neimark

(57) ABSTRACT

A cellular system, in which frequency channels are allocated among transceivers which transmit to sectors of a cell, in which adjacent frequencies do not appear in adjacent sectors within the cell. A series of consecutive frequency channels is allocated to these transceivers, sequentially and alternately between opposing pairs of vertical sectors. Allocation is started from a first pair, and continued, each time, to the next pair which is adjacent to its preceding pair in clockwise or counterclockwise direction. Optionally, at least one frequency channel from the series of frequency channels is skipped, each time before continuing to allocate frequency channels to the next pair. By doing so, adjacent frequency channels are not allocated to adjacent sectors, and adjacent frequency channels do not appear in adjacent sectors even after moving allocated frequency channels from a sector to each of its adjacent sectors.

25 Claims, 3 Drawing Sheets

METHOD FOR ALLOCATING FREQUENCY CHANNELS FOR SECTORS OF A CELL IN CELLULAR SYSTEMS

FIELD OF THE INVENTION

The present invention relates to the field of communications. More particularly, the invention relates to a method for allocating frequency channels between sectors of a cell of a cellular system that minimizes the interference between adjacent sectors.

BACKGROUND OF THE INVENTION

Wireless telephone networks are widespread and well known in the art. A typical network is a cellular telephone network, that enables a plurality of subscribers to communicate with each other and with subscribers of other telephone networks by communicating with a plurality of base stations, which are actually transceivers (transmitters/receivers), located usually near the center of each cell and transmitting via directional antennas, normally one directional antenna for each sector of the cell. In this network, however, subscriber units normally use omni-directional antennas because of the mobility of each subscriber. In other cases, transceivers of the base stations at each cell may use omni-directional antennas. Co-channel interference in cellular systems that use omni-directional antennas for their base-station transceivers is normally high and is minimized by using only a part of the allocated frequencies in every cell. Co-channel interference in cellular systems that use directional antennas for their base-station transceivers is normally minimized by allocating different frequencies to transceivers that are oriented in the same direction in adjacent cells.

Wireless systems (networks) are often desired in rural areas and developing countries, where the existing capacity of wireline networks is low, and wire installation is of high cost. In addition, it is used anywhere that cabling is not available, or is overly expensive, or where mobility is desired. In these systems, the subscriber units may be mobile, or fixed in location. Since the range of frequency bands that can be used by a wireless system is limited, several methods were developed to enable simultaneous use of channels within the range of frequency bands in the system. Thus, more subscribers can be served using the same range of frequencies. These methods improved the co-channel interference between cells basically by allocating frequency channels according to a plan wherein reuse of frequencies is only allowed in distant sites and/or by obtaining different orientation for positioning the directional antennas of the transceivers at each base station site. Therefore the quality of service of the network subscribers is increased.

In some applications, the transceiver of each base station employs more than one frequency channel to communicate with subscriber units. Directional antennas are used to break up a site, known as a cell, to sectors. This raises a problem of interference between adjacent channels of adjacent sectors. Therefore, basic planning requires that adjacent frequency bands are allocated to non-adjacent sectors.

The flexibility to dynamically move frequency channels from one sector to another is highly desired. For example, if one sector is heavily loaded and another sector is slightly loaded, it is desirable to re-allocate frequency channels, so that frequency band(s) from the slightly loaded sector will be used in the heavily loaded sector, in such a way that a configuration in which adjacent frequency channels appear in adjacent sectors is eliminated.

European Patent Application EP 717577 describes a cellular communication network that employs directional antennas, each of which corresponds to a sector of a cell, and transmits to subscriber units located within the sector. The orientation of antennas, in any adjacent cells, that operate in the same frequency band is different, and therefore the co-channel interference is reduced. However, no flexibility of frequency layout in the cell is discussed, and intrasite interference is not dealt with.

U.S. Pat. No. 5,365,571 describes a cellular radiotelephone system, in which cells are grouped into a plurality of clusters, each of which has an identical number of n adjacent cells. A set of frequencies is assigned to each cell, so that n groups of co-channel cells are formed. Each formed group includes one cell from each cluster, that comprises frequency channels which correspond to the frequency channels for its co-channel cell group. Co-channel sectors in successive co-channel cells are rotated in the clockwise or counter-clockwise direction from a predetermined reference direction, so as to reduce co-channel interference. Again, no flexibility of frequency layout in the cell is discussed, and intrasite interference is not dealt with.

U.S. Pat. No. 5,073,971 describes a cellular radio telephone system with cells that are divided to six sectors, each sector comprises a directional antenna. Frequency channel assignment forms rows corresponding to a two cell reuse pattern according to asymmetrically positioning of the repeating frequency groups, so that one row faces the opposite direction of another row. Therefore, the number of times a frequency can be reused is increased. However, all the above-described patents relate to methods for reducing the co-channel interference resulting from sectors of different cells operating at the same frequency channel. Non of these patents is related to interference between adjacent sectors of the same cell or the transfer of frequency channels from a sector to an adjacent sector.

All the methods described above have not yet provided satisfactory solutions to the problem of minimizing the interference between frequency channels allocated to sector of a cell and frequency channels allocated to other sectors of that cell.

It is an object of the present invention to provide a method for allocating frequency channels to sectors of a cell in a cellular system, which overcomes the drawbacks of prior art.

It is another object of the present invention to provide a method for allocating frequency channels to sectors of a cell in a cellular system, with minimized interference between frequency channels allocated to sector of a cell and frequency channels which are allocated to sectors which are adjacent to this sector.

It is a further object of the present invention to provide a method for allocating frequency channels to sectors of a cell that enable the translation of frequency channels without increasing the interference between adjacent sectors, thereby providing sufficient flexibility in accordance with dynamic system requirements.

Other objects and advantages of the invention will become apparent as the description proceeds.

SUMMARY OF THE INVENTION

The present invention is directed to a method for allocating frequency channels between transceivers which transmit to sectors of a cell of a cellular system, with minimal interference between adjacent sectors within the cell. A series of frequency channels, which may be a consecutive series, is allocated to these transceivers, sequentially and alternately between opposing pairs of vertical sectors. Allocation is started from a first pair, and continued, each time, to the next pair which is adjacent to its preceding pair in clockwise or counter-clockwise direction. Preferably, at least one frequency channel from the series of frequency channels is skipped, each time before continuing to allocate frequency channels to the next pair. The order of allocation may also be reversed within sectors forming every other pair. By doing so, identical frequency channels are not allocated twice to the same cell, and adjacent frequency channels are not allocated to the same sector, or to adjacent sectors. Furthermore, adjacent frequency channels do not appear in adjacent sectors even after moving an allocated frequency channel from a sector to each of its adjacent sectors.

Preferably, this allocation method is also suitable for transceivers of cellular systems which employ a frequency hopping technique. The first allocated frequency channel represents the starting point in the hopping cycle for each transceiver. Preferably, sectors of a cell may employ several transceivers, each of which uses a single frequency channel, or a single transceiver that uses several frequency channels for transmission.

The invention is also directed to a cellular system, in which frequency channels are allocated to transceivers which transmit to sectors of a cell, with minimum interference between adjacent sectors within the cell and retain dynamic translations capability of allocated frequency channels from one sector to each of its adjacent sectors.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE PREFERRED EMBODIMENTS

Radio transceivers located in a base station of a cell suffer from mutual interference between themselves. Using a given frequency channel from a given frequency band, may reduce the quality of service of another transceiver which is also located in the same cell. The interference problem is further aggravated when it is required to increase the number of subscribers that may be served by each transceiver, by maximally exploiting the frequency band. When doing so, some kind of interference may be present when some frequency channels are used in adjacent sectors or in sectors with overlapping transmitting directions. For instance, interference may appear when adjacent sectors use adjacent frequency channels.

A typical method to maximize the use of frequencies in a cellular system, is to break each base station site (known as a cell) into s sectors, with each sector being served by one or more directional antennas. The total range of frequencies to be used in the cell, must be allocated to the sectors. A given frequency band may be divided into n frequency channels, with the channels being numbered in the order of their actual frequency. For example, in the case of channels centered 1 MHz apart, 1401 MHz=1, 1402 MHz=2, 1403 MHz=3 etc., up to n channels, which are all exploited in a given cell. In this manner, adjacent indexes are assigned to adjacent frequency channels. Typically, each base station transceiver, also known as a base station unit, handles one frequency channel, of which there are k transceivers, which can be labeled, $f_1, f_2 \ldots, f_k$. Thus, $f_1$ is the number of the channel assigned to the base station unit #1, and $f_k$ represents the number of the channel, assigned to the base station unit #k. Each sector may have more than one base station unit and associated channel, depending on the number of subscriber units in the sector.

The first rule, according to a preferred embodiment of the invention, for minimizing interference, is not to allow and frequency to be reused in a cell, i.e., $f_i \neq f_j$, for any i and j representing two base station units (transceivers) in the same cell. The second rule, is to eliminate the use of adjacent frequency channels in the same sector or in adjacent sectors, i.e., $|f_i - f_j| \neq 1$, for any i and j representing any two base station units (transceivers) in the same sector or in adjacent sectors.

Figure 1A:
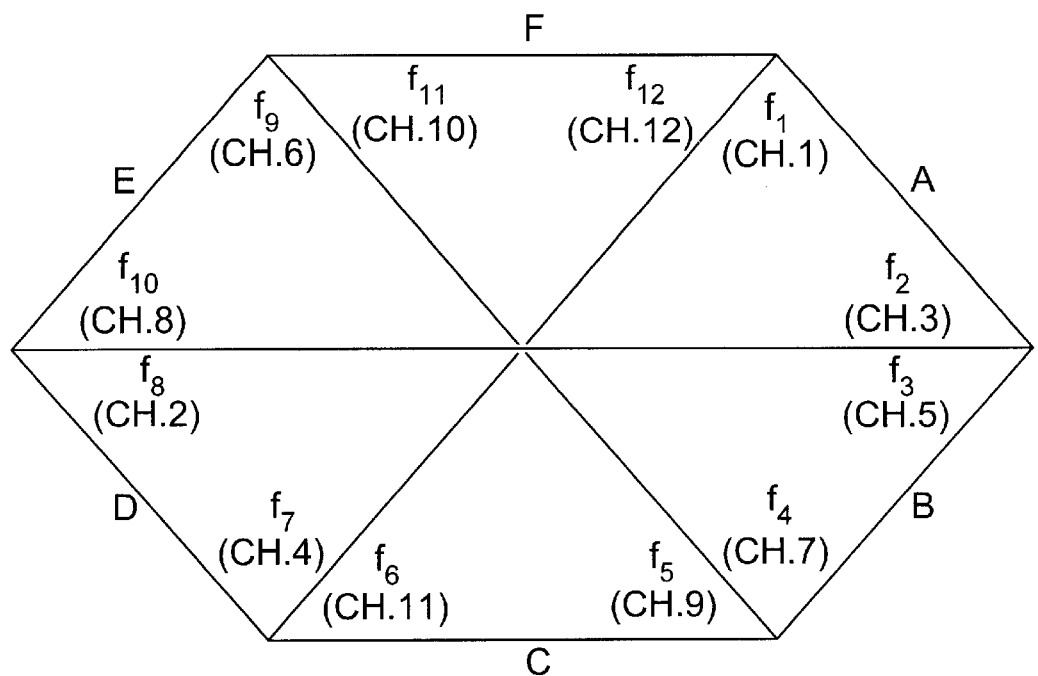
FIG. 1A is a schematic diagram of an exemplary frequency channel allocation within a cell, with minimal interference, according to a preferred embodiment of the invention.

FIG. 1A is a schematic diagram of an exemplary frequency channel allocation within a cell, with minimal interference, according to a preferred embodiment of the invention. In this example, the cell 10 comprises 6 sectors, A,B, . . . , F. This allocation is a uniform allocation, according to which an equal number of base station transceivers, at each sector, are used to communicate with subscribers. As stated before, each base station transceiver handles one frequency channel. In this example, 12 frequency channels, 1, 2, . . . , 12, are assigned to the cell 10, according to the following order:

1 and 3 to sector A;
5 and 7 to sector B;
9 and 11 to sector C;
2 and 4 to sector D;
6 and 8 to sector E; and
10 and 12 to sector F.

Figure 1B:
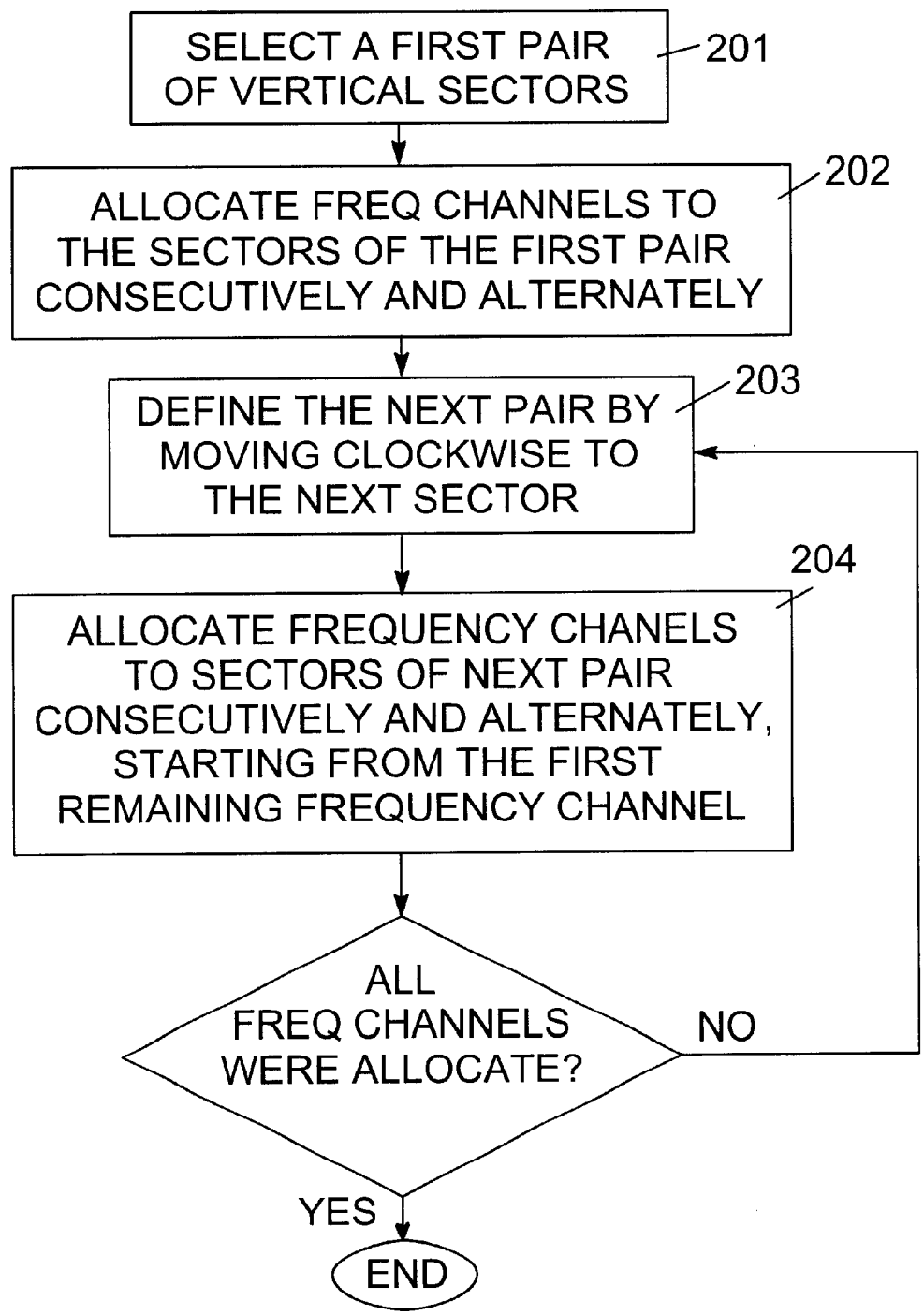
FIG. 1B is a flow chart of exemplary frequency channel allocation of FIG. 1A, according to a preferred embodiment of the invention.

Frequency allocation in the example of FIG. 1A is carried out, according to a preferred embodiment of the invention, by a series of steps presented in FIG. 1B. At the first step 201, a first pair of vertical opposing sectors, <A,D>, is selected for frequency channel allocation. At the next step 202, frequency channels are allocated sequentially and alternately between the sectors of the first pair <A,D>, starting from channel 1, which is allocated to the first base station of the first sector (A) of the first pair. In this example, channel 1 is allocated to $f_1$, then channel 2 to $f_7$, then channel 3 to $f_2$ and finally channel 4 to $f_8$. At the next step 203, the next pair of vertical sectors is defined by returning back to the first sector (A) of the first pair and moving clockwise to the adjacent sector (B), which is actually the first sector of the next pair <B,E>. At the next step 204, frequency channels are allocated sequentially and alternately between the sectors of the next (second) pair <B,E>, starting from channel 5 to $f_3$, which is allocated to the first sector (B) of the second pair. This process is repeated accordingly, until all frequency channels are allocated to all sectors, i.e., channel 9 to $f_5$, channel 10 to $f_{11}$, channel 11 to $f_6$ and channel 12 to $f_{12}$. Alternatively, channels may be assigned inversely to alternate pairs, i.e., starting with sector E instead of B, and the third pair could revert first to sector C, and then sector F. Base station units, handling more than one frequency channel, can also be used, with the same frequency channel allocation rules.

According to a preferred embodiment of the invention, similar process may be implemented also in case when a non-uniform allocation (i.e., when different number of frequency channels are allocated to different sectors) is desired. This allocation fulfills the two conditions, $f_i \neq f_j$ and $|f_i - f_j| \neq 1$. Looking again at FIG. 1A, the flexibility of moving frequency channels from one sector to any adjacent sector, according to varying frequency channel demands at each sector, may be limited. For instance, if the load at sector C becomes heavier than in sectors B or D, it is desired to reinforce the capacity of sector C by moving one or more frequency channels from sector B to C or from D to C. By moving the base station with associated frequency $f_3$ (channel 5) from sector B to sector C, the condition $|f_i - f_j| \neq 1$ is not fulfilled, since the adjacent frequency channel, channel 4, associated with $f_8$ is used in adjacent sector D, and therefore, the mutual interference between their corresponding transceivers will be increased. The same happens while moving channel 4, associated with $f_8$ from sector D to sector C. According to a preferred embodiment of the invention, further isolation between frequency channels of adjacent sectors may be provided by skipping a frequency channel before allocating frequency channels to the next pair (before performing step 204).

Figure 2:
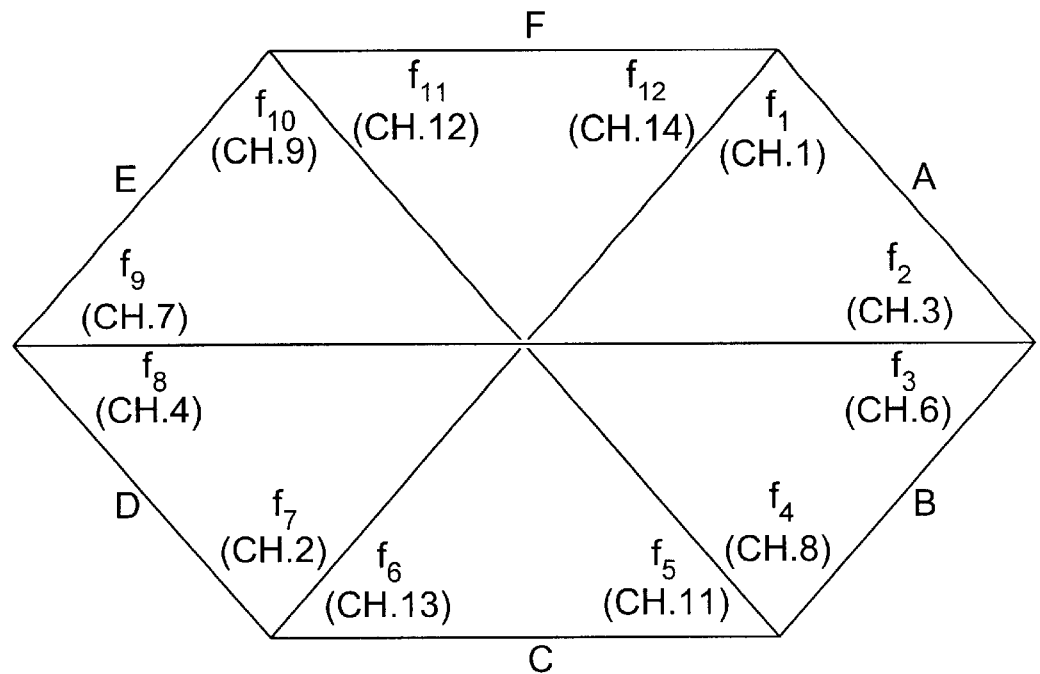
FIG. 2 is a schematic diagram of frequency channel allocation between sectors of a cell that enables frequency channel translation from a sector to its adjacent sector(s), according to a preferred embodiment of the invention.

FIG. 2 is a schematic diagram of an exemplary frequency channel allocation within a cell that provides the desired flexibility, according to a preferred embodiment of the invention. The method employed is based on the same number of different frequency channels, which are selected from a wider range of frequency channels. In the example of FIG. 2, 12 frequency channels, out of 14 possible frequency channels, 1 to 4, 6 to 9, and 11 to 14, are assigned to the cell 10, according to the following order:

channel 1 to $f_1$ of sector A;

channel 2 to $f_7$ of sector D;

channel 3 to $f_2$ of sector A;

channel 4 to $f_8$ of sector D;

channel 6 to $f_3$ of sector B;

channel 7 to $f_9$ of sector E;

channel 8 to $f_4$ of sector B;

channel 9 to $f_{10}$ of sector E;

channel 11 to $f_5$ of sector C;

channel 12 to $f_{11}$ of sector F;

channel 13 to $f_6$ of sector C; and channel 14 to $f_{12}$ of sector F. Frequency channels 5 and 10 are not utilized.

Figure 3:
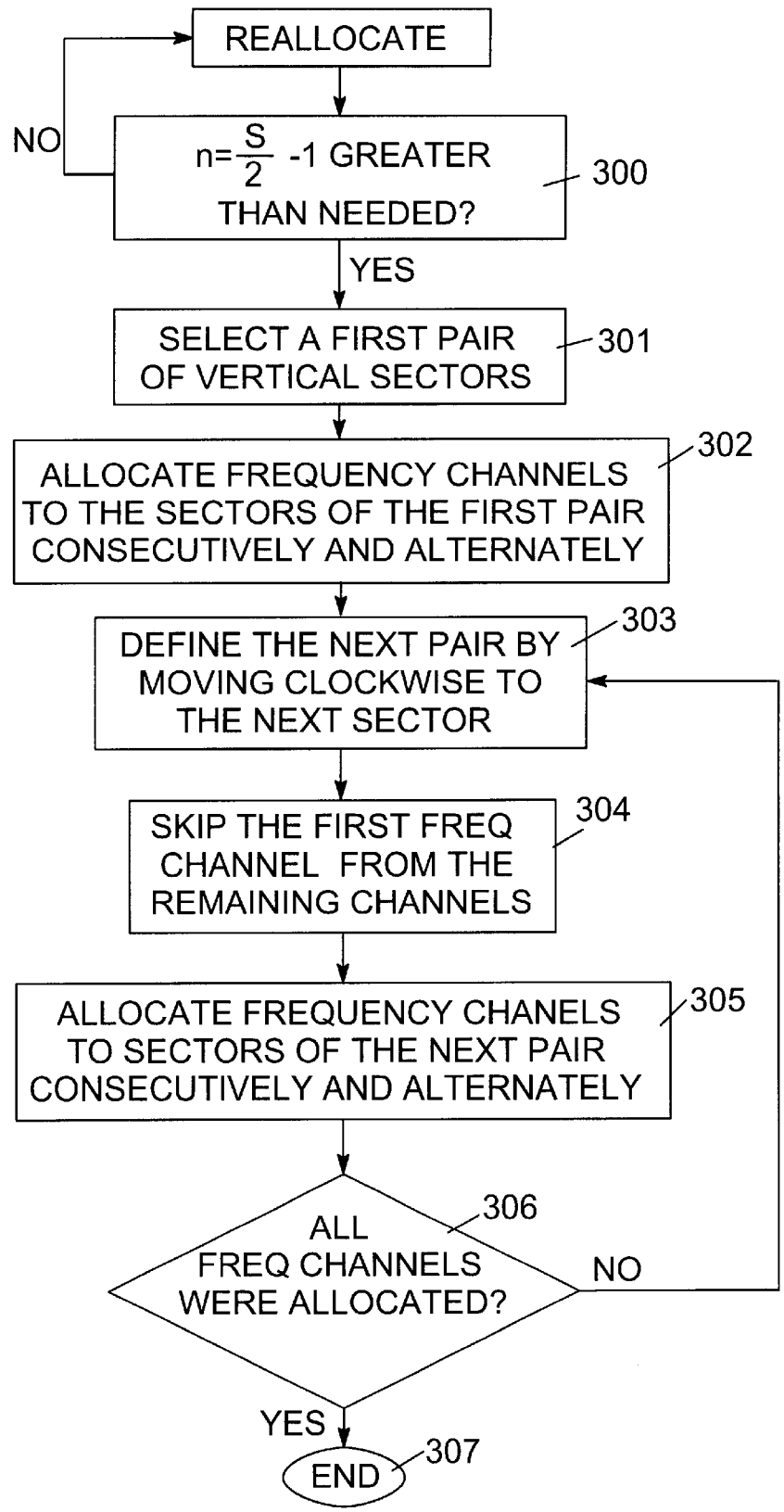
FIG. 3 is a flow chart of frequency channel allocation that enables frequency channel translation from a sector to its adjacent sector(s), according to a preferred embodiment of the invention.

FIG. 3 is a flow chart that illustrates frequency channel allocation that enables the translation of frequency channels from at least one sector to its adjacent sector(s) with minimal interference effect, according to a preferred embodiment of the invention. The first step 300 is to ensure that the number of available frequency channels is s/2−1, or the same number rounded up to the nearest integer, greater than the number of required channels. If not, the number of channels is reallocated, until one of the conditions of step 300 is fulfilled. At the next step 301, a first pair of vertical sectors, (<A,D> in the example of FIG. 2), is selected for frequency channel allocation. At the next step 302, frequency channels are allocated sequentially and alternately between the sectors of the first pair (<A,D> in the example of FIG. 2), starting from channel 1, which is allocated to the first base station unit in sector (A) of the first pair. In this example, channel 1 is allocated to the first base station unit in sector A, then channel 2 to sector D, then channel 3 to sector A and finally channel 4 to sector D. At the next step 303, the next pair of vertical sectors is defined by returning back to the first sector (A) of the first pair and moving clockwise to the adjacent sector (B), which is actually the first sector of the next pair (<B,E> in the example of FIG. 2). At the next step 304, the next frequency channel 5 is skipped. At the next step 305, frequency channels are allocated sequentially and alternately between the sectors of the second pair (<B,E>), starting from channel 6, which is allocated to the first sector (B) of the second pair, until all the required frequency channels (6 to 9 in this example) are allocated to the second pair <B,E>. At the next step 306, the allocation of all frequency channels is checked. If additional unallocated frequency channels remain (as well as additional remaining sectors, to which no frequency channels were allocated), this process may be repeated accordingly by repeating steps 303 to 306 above, until all frequency bands are allocated to all sectors. If all frequency channels were allocated, the process is terminated at step 307.

Alternatively, the pair order can be reversed at each rotation, thereby allocating frequency channels to <E,B>, instead of to <B,E> in this example.

With reference to the example of FIG. 2 above, the next pair of vertical sectors is defined (repeating step 303) by returning back to the first sector (B) of the second pair and moving clockwise to the adjacent sector (C), which is actually the first sector of the next pair (<C,F> in the example of FIG. 2). The next frequency channel 10 is skipped (repeating step 304), and frequency channels are allocated sequentially and alternately (repeating step 305) between the sectors of the third pair <C,F>, starting from channel 11, which is allocated to the first sector (C) of the third pair, until all the required frequency channels (11 to 14 in this example) are allocated to the third pair (<C,F>).

A similar process may be implemented also in case when a non-uniform allocation (i.e., when different number of frequency channels are allocated to different sectors) is desired. This allocation fulfills the two conditions, $f_i \neq f_j$ and $|f_i - f_j| \neq 1$.

According to a preferred embodiment of the invention, the allocation method illustrated in FIGS. 2 and 3, enables a frequency channel translation from any sector to its adjacent sector(s) while fulfilling the conditions $f_i \neq f_j$ and $|f_i - f_j| \neq 1$. For example, by re-examining the frequency channel translations (illustrated with reference to FIG. 2) from sectors B or D to sector C, channel 6 and/or channel 8 and channel 2 and/or channel 4 may be translated from sectors B and D, respectively, to sector C. Therefore, the desired flexibility is achieved by this allocation method, and frequency channel translation may be implemented adaptively upon demand. If a non-uniform allocation is originally required, optionally, a uniform allocation may be carried out first, and frequency channel translation after. Furthermore, by using this allocation, such frequency translation may be carried out simultaneously for more than one sector, and even more than one time, while still fulfilling the two conditions, $f_i \neq f_j$ and $|f_i - f_j| \neq 1$. However, the resulting layout should be checked, to be sure that these conditions are fulfilled.

This allocation method may be generalized and implemented, according to another preferred embodiment of the invention, to cells with any given even number s of sectors which is greater than 6. For a given s (s≧6), the number of required frequency channels n should comply with the condition that n−(S/2−1) is an integer multiple of s (in the example of FIG. 2, s=6 n=14 and therefore n−(s/2−1)=12 is an integer multiple of s=6). The number of unused frequency channels according to the generalized method of the present invention is s/2−1 for any given number n of frequency channels. Therefore, n−(s/2−1) frequency channels should be exploited, while additional s/2−1 channels should be skipped in this cell. According to a preferred embodiment of the invention, the unused frequency channels may be used by other cells.

According to another preferred embodiment of the invention, the frequency allocation method described above may be also implemented in cellular systems that use Frequency Hopping (FH), in which all the transceivers use a single series of frequency channels and their transmission frequency is varied synchronously in time, according to a predetermined pattern. Looking again at FIG. 2, a frequency channel allocation which is applicable for FH systems is shown. Frequency hopping is carried out in a cyclic order, starting with frequencies that were allocated to each transceiver. The hopping series in this example consists of a cyclical order of frequency channel sets: The first half of the channel set, 1,6,11,2,7,12, comprises all the frequency channels that were firstly allocated to each of the sectors A,B,C,D,E,F, respectively, the second half of the channel set, 3,8,13,4,9,14. i.e., all the frequency channels that were allocated secondly to each of the sectors A,B,C,D,E,F, respectively, etc. In a FH system, all stations change their frequencies simultaneously, and all stations follow the same cyclical pattern, 1→6→11→2→7→12→3→8→13→4→9→14→1→ . . ., but with a different starting point. As previously explained, the starting point for each transceiver is shown in FIG. 2 above. Therefore, the hopping frequencies for the transceivers are given by:

1→6→11→2→7→12→3→8→13→4→9→14→1→ . . . in base station unit 1 ($f_1$);
3→8→13→4→9→14→1→6→11→2→7→12→3→ . . . in base station unit 2 ($f_2$);
6→11→2→7→12→3→8→13→4→9→14→1→6→ . . . in base station unit 3 ($f_3$);
8→13→4→9→14→1→6→11→2→7→12→3→8→ . . . in base station unit 4 ($f_4$);
11→2→7→12→3→8→13→4→9→14→1→6→11→ . . . in base station unit 5 ($f_5$);
13→4→9→14→1→6→11→2→7→12→3→8→13→ . . . in base station unit 6 ($f_6$);
2→7→12→3→8→13→4→9→14→1→6→11→2→ . . . in base station unit 7 ($f_7$);
4→9→14→1→6→11→2→7→12→3→8→13→4→ . . . in base station unit 8 ($f_8$);
7→12→3→8→13→4→9→14→1→6→11→2→7→ . . . in base station unit 9 ($f_9$);
9→14→1→6→11→2→7→12→3→8→13→4→9→ . . . in base station unit 10 ($f_{10}$);
12→3→8→13→4→9→14→1→6→11→2→7→12→ . . . in base station unit 11 ($f_{11}$); and
14→1→6→11→2→7→12→3→8→13→4→9→14→ . . . in base station unit 12 ($f_{12}$).

Hence, the allocation of frequency channels, allocated to adjacent sectors, always maintain the desired flexibility. Several different cyclical patterns for frequency hopping can be developed for use in the above example. As another non-limiting example, one could follow a clockwise pattern beginning with the first allocated frequency, and take one frequency at random from each sector. Once the first clockwise rotation has been completed, the remaining frequency from each sector can be taken in the next circuit to complete the pattern.

Of course, the allocation method presented by the invention may be generalized and implemented, according to another preferred embodiment of the invention, to cellular systems that employ FH techniques and comprise cells with any given number of sectors which is greater than 6. In addition, this allocation method may be used in cellular systems, in which sectors of a cell employ several transceiver, each using a single frequency channel for transmission, as well as in cellular systems, in which sectors of a cell employ a single transceiver that uses several frequency channels for transmission.

The above examples and description have of course been provided only for the purpose of illustrations, and are not intended to limit the invention in any way. As will be appreciated by the skilled person, the invention can be carried out in a great variety of ways, such as advancing from a pair of vertical sectors to the next pair in counter-clockwise direction, employing more than one technique from those described above, all without exceeding the scope of the invention.

What is claimed is:

1. A method for allocating frequency channels among transceivers which transmit to sectors of a cell contained in a cellular system of a telephone network, said sectors forming a number of opposed pairs, wherein adjacent sectors of said cell do not contain adjacent frequency channels and frequency channels are not reused in the same cell, comprising the steps of:
    determining a sequence of frequency channels;
    allocating different frequency channels to the opposing sectors of a first pair of sectors; and
    continuing to allocate different frequency channels to the opposing sectors of remaining pairs of said sectors, successively to pairs of sectors, each of which is adjacent to the preceding pair in a clockwise or counter clockwise direction.

2. A method according to claim 1 further comprising skipping at least one frequency channel from the series of frequency channels, each time before continuing to allocate frequency channels to the next pair, thereby enabling the dynamic translation of at least one allocated frequency channel to at least one adjacent sector without having adjacent frequency channels in adjacent sectors.

3. A method according to claim 1, wherein the order of allocation is reversed, within sectors forming every other pair.

4. A method according to claim 2, wherein the order of allocation is reversed, within sectors forming every other pair.

5. A method according to claim 1, wherein frequency hopping is used, and the allocated frequency channel representing the starting point in the hopping cycle for said transceiver.

6. A method according to claim 2, wherein frequency hopping is used, and the allocated frequency channel representing the starting point in the hopping cycle for said transceiver.

7. A method according to claim 1, wherein sectors of a cell employ several transceivers, each of which using a single frequency channel for transmission.

8. A method according to claim 2, wherein sectors of a cell employ several transceivers, each of which using a single frequency channel for transmission.

9. A method according to claim 1, wherein sectors of a cell employ at least one transceiver that uses several frequency channels for transmission.

10. A method according to claim 2, wherein sectors of a cell employ at least one transceiver that uses several frequency channels for transmission.

11. A method for allocating frequency channels according to claim 1, further comprising the step of:
determining a sequence of frequency channels wherein the frequency of each channel differs by a fixed frequency increment from those of the channels adjacent thereto in said sequence.

12. A method according to claim 11, wherein the pluralities of frequency channels are pairs.

13. A cellular system having frequency channels allocated among transceivers which transmit to sectors of a cell contained in a cellular system of a telephone system, wherein adjacent sectors of said cell do not contain adjacent frequency channels and frequency channels are not reused in the same cell, wherein a succession of frequency channels is allocated to said transceivers sequentially and alternatively between pairs of opposed vertical sectors and, wherein the frequency of each channel differs by a fixed frequency increment from those of the channels of adjacent thereto in said sequence, starting from allocating a pair of frequency channels to a first pair of said opposing sectors and continuing to allocate pairs of frequency channels, each time, to the next pair of opposing sectors, each time said next pair being adjacent to its preceding pair in a clockwise or counter clockwise direction.

14. A cellular system according to claim 13, in which at least one frequency channel from the series of frequency channels is skipped, each time before continuing to allocate frequency channels to the next pair.

15. A cellular system according to claim 13, in which the order of allocation is reversed, within sectors forming every other pair.

16. A cellular system according to claim 14, in which the order of allocation is reversed, within sectors forming every other pair.

17. A cellular system according to claim 13, in which frequency hopping is used, and the allocated frequency channel represents the starting point in the hopping cycle for said transceiver.

18. A cellular system according to claim 14, in which frequency hopping is used, and the allocated frequency channel represents the starting point in the hopping cycle for said transceiver.

19. A cellular system according to claim 13, in which sectors of a cell employ several transceivers, each of which uses a single frequency channel for transmission.

20. A cellular system according to claim 14, in which sectors of a cell employ several transceivers, each of which uses a single frequency channel for transmission.

21. A cellular system according to claim 13, in which sectors of a cell employ at least one transceiver that uses several frequency channels for transmission.

22. A cellular system according to claim 14, in which sectors of a cell employ at least one transceiver that uses several frequency channels for transmission.

23. A cellular system according to claim 13, wherein the pluralities of frequency channels are pairs.

24. A method for allocating frequency channels among transceivers which transmit to sectors of a cell contained in a cellular system of a telephone network, said sectors forming a number of opposing pairs, wherein adjacent sectors of said cell do not contain adjacent frequency channels and frequency channels are not being reused in the same cell, comprising the steps of:
allocating different pluralities of frequency channels to opposing sectors of a first pair of sectors; and
continuing to allocate different pluralities of frequency channels to each of the opposing sectors of remaining pairs of said sectors, successively to pairs of said sectors, each of which is adjacent to the preceding pair in a clockwise or a counter clockwise direction.

25. A cellular system having frequency channels allocated among transceivers which transmit to sectors of a cell contained in a cellular system of a telephone network, said sectors forming a number of opposing pairs, wherein adjacent sectors of said cell do not contain adjacent frequency channels and frequency channels are not being reused in the same cell, comprising allocating different pluralities of frequency channels to the opposing sectors of a first pair, and continuing to allocate different pluralities of frequency channels to the opposing sectors of the other pairs, successively to pairs each of which is adjacent to the preceding pair in a clockwise or counter clockwise direction.

* * * * *